United States Patent
Miyamoto et al.

(10) Patent No.: US 10,174,483 B2
(45) Date of Patent: Jan. 8, 2019

(54) WORK VEHICLE AND METHOD FOR CONTROLLING WORK VEHICLE

(71) Applicant: KOMATSU LTD., Tokyo (JP)

(72) Inventors: Shunsuke Miyamoto, Atsugi (JP); Kenichi Yamada, Fujisawa (JP); Kaoru Yasuda, Komatsu (JP)

(73) Assignee: KOMATSU LTD., Tokyo (JP)

( * ) Notice: Subject to any disclaimer, the term of this patent is extended or adjusted under 35 U.S.C. 154(b) by 387 days.

(21) Appl. No.: 14/904,487

(22) PCT Filed: Dec. 10, 2014

(86) PCT No.: PCT/JP2014/082707
§ 371 (c)(1),
(2) Date: Jan. 12, 2016

(87) PCT Pub. No.: WO2015/111317
PCT Pub. Date: Jul. 30, 2015

(65) Prior Publication Data
US 2017/0044736 A1    Feb. 16, 2017

(30) Foreign Application Priority Data
Jan. 22, 2014 (JP) .................. 2014-009194

(51) Int. Cl.
*B60W 10/08* (2006.01)
*E02F 9/20* (2006.01)
(Continued)

(52) U.S. Cl.
CPC .............. *E02F 9/207* (2013.01); *B60K 6/365* (2013.01); *B60K 6/387* (2013.01); *B60K 6/445* (2013.01);
(Continued)

(58) Field of Classification Search
None
See application file for complete search history.

(56) References Cited

U.S. PATENT DOCUMENTS

| 5,492,192 A * | 2/1996 | Brooks | .................. B60K 28/16 |
| | | | 180/165 |
| 6,491,120 B1 * | 12/2002 | Ogburn | .................... B60K 6/48 |
| | | | 180/2.2 |

(Continued)

FOREIGN PATENT DOCUMENTS

| EP | 1 122 109 A2 | 8/2001 |
| EP | 2 202 430 A1 | 6/2010 |

(Continued)

OTHER PUBLICATIONS

The International Search Report for the corresponding international application No. PCT/JP2014/082707, dated Mar. 3, 2015.

(Continued)

*Primary Examiner* — Dirk Wright
(74) *Attorney, Agent, or Firm* — Global IP Counselors, LLP

(57) ABSTRACT

A power transmission device of a work vehicle has an input shaft, an output shaft, a gear mechanism, and an electric motor. The gear mechanism has a planetary gear mechanism and transmits the rotation of the input shaft to the output shaft. The electric motor is connected to a rotating element of the planetary gear mechanism. The power transmission device is configured to change the rotation speed ratio of the output shaft with respect to the input shaft by changing the rotation speed of the electric motor. A control unit has a target torque determination unit and a target torque correcting unit. The target torque determination unit determines a target torque of the electric motor. The target torque correcting unit corrects the target torque according to a correction torque based on a moment of inertia of the electric motor.

16 Claims, 7 Drawing Sheets

(51) Int. Cl.

| | |
|---|---|
| *B60K 6/445* | (2007.10) |
| *B60L 11/14* | (2006.01) |
| *B60W 10/10* | (2012.01) |
| *B60W 20/00* | (2016.01) |
| *B60L 11/00* | (2006.01) |
| *B60L 11/12* | (2006.01) |
| *B60L 15/20* | (2006.01) |
| *B60K 6/365* | (2007.10) |
| *B60K 6/387* | (2007.10) |
| *B60K 6/547* | (2007.10) |
| *H02P 5/747* | (2006.01) |
| *B60K 6/54* | (2007.10) |
| *E02F 3/28* | (2006.01) |
| *F16H 3/72* | (2006.01) |
| *E02F 3/34* | (2006.01) |
| *B60K 6/38* | (2007.10) |
| *B60K 6/44* | (2007.10) |

(52) U.S. Cl.
CPC .......... *B60K 6/54* (2013.01); *B60K 6/547* (2013.01); *B60L 11/005* (2013.01); *B60L 11/123* (2013.01); *B60L 11/14* (2013.01); *B60L 15/2054* (2013.01); *B60W 10/08* (2013.01); *B60W 10/10* (2013.01); *B60W 20/00* (2013.01); *E02F 3/283* (2013.01); *E02F 9/202* (2013.01); *E02F 9/2004* (2013.01); *E02F 9/2075* (2013.01); *E02F 9/2079* (2013.01); *F16H 3/728* (2013.01); *H02P 5/747* (2013.01); *B60K 6/44* (2013.01); *B60K 2006/381* (2013.01); *B60L 2200/40* (2013.01); *B60L 2240/12* (2013.01); *B60L 2240/421* (2013.01); *B60L 2240/423* (2013.01); *B60L 2240/441* (2013.01); *B60L 2240/486* (2013.01); *B60L 2250/24* (2013.01); *B60L 2250/26* (2013.01); *B60W 2300/17* (2013.01); *B60W 2710/083* (2013.01); *B60Y 2200/415* (2013.01); *E02F 3/3411* (2013.01); *Y02P 90/60* (2015.11); *Y02T 10/6217* (2013.01); *Y02T 10/6239* (2013.01); *Y02T 10/645* (2013.01); *Y02T 10/7022* (2013.01); *Y02T 10/7077* (2013.01); *Y02T 10/72* (2013.01); *Y02T 10/7275* (2013.01); *Y10S 903/903* (2013.01)

(56) References Cited

U.S. PATENT DOCUMENTS

| | | | | |
|---|---|---|---|---|
| 6,622,805 B2 * | 9/2003 | Nakashima | ............... | B60K 6/48 180/65.25 |
| 6,625,524 B2 * | 9/2003 | Yamaguchi | ............. | B60K 6/365 701/22 |
| 6,840,341 B2 * | 1/2005 | Fujikawa | ............... | B60W 10/04 180/65.25 |
| 7,010,400 B2 * | 3/2006 | Hisada | ................... | B60K 6/445 290/40 C |
| 7,024,290 B2 * | 4/2006 | Zhao | ...................... | B60K 6/445 180/65.6 |
| 7,117,071 B2 * | 10/2006 | Aoki | ..................... | B60K 6/445 701/22 |
| 7,164,247 B2 * | 1/2007 | Joe | ......................... | B60K 6/445 180/65.22 |
| 7,261,670 B2 * | 8/2007 | Endo | ..................... | B60K 6/365 477/3 |
| 7,292,917 B2 * | 11/2007 | Kuang | ................... | B60K 6/445 180/65.285 |
| 7,335,124 B2 * | 2/2008 | Yatabe | ................... | B60K 6/445 180/65.265 |
| 7,353,094 B2 * | 4/2008 | Okoshi | .................. | B60K 6/445 180/65.1 |
| 7,357,204 B2 * | 4/2008 | Hisada | .................. | B60K 6/445 180/381 |
| 7,472,769 B2 * | 1/2009 | Yamanaka | .......... | B60W 30/186 180/65.25 |
| 7,607,499 B2 * | 10/2009 | Egami | ..................... | B60K 6/365 180/65.21 |
| 7,742,851 B2 * | 6/2010 | Hisada | ................... | B60K 6/445 180/65.1 |
| 7,955,215 B2 * | 6/2011 | Shibata | ................. | B60K 6/445 180/65.285 |
| 7,976,427 B2 * | 7/2011 | Yamamoto | ............... | B60K 6/48 477/4 |
| 8,417,431 B2 * | 4/2013 | Okubo | ................... | B60W 20/10 180/65.265 |
| 8,457,823 B2 * | 6/2013 | Falkenstein | .......... | B60W 10/08 180/348 |
| 8,506,448 B2 * | 8/2013 | Hokoi | .................... | B60K 6/445 477/3 |
| 8,602,936 B2 * | 12/2013 | Ichikawa | ............... | B60K 6/543 475/162 |
| 8,753,242 B2 * | 6/2014 | Hibino | .................... | B60K 6/38 475/5 |
| 8,843,291 B2 * | 9/2014 | Ozaki | ................... | B60K 17/046 701/84 |
| 9,278,681 B2 * | 3/2016 | Liang | .................... | B60W 10/06 |
| 9,487,210 B2 * | 11/2016 | Yamamoto | ............. | B60K 6/365 |
| 9,834,203 B2 * | 12/2017 | Hata | ....................... | B60W 10/06 |
| 9,855,857 B2 * | 1/2018 | Klymenko | ............. | B60L 15/20 |
| 2005/0203680 A1 | 9/2005 | Hisada et al. | | |
| 2005/0283283 A1 | 12/2005 | Hisada et al. | | |
| 2007/0103106 A1 | 5/2007 | Iwanaka et al. | | |
| 2008/0208422 A1 * | 8/2008 | Shibata | ................... | B60K 6/365 701/54 |
| 2011/0212804 A1 | 9/2011 | Imamura et al. | | |
| 2012/0108378 A1 | 5/2012 | Hiraki et al. | | |
| 2014/0167423 A1 * | 6/2014 | Pischinger | ............ | B60L 11/123 290/40 A |

FOREIGN PATENT DOCUMENTS

| | | | | |
|---|---|---|---|---|
| JP | 2000-104575 A | | 4/2000 | |
| JP | 2000-152410 A | | 5/2000 | |
| JP | 2001-213181 A | | 8/2001 | |
| JP | 2006-6065 A | | 1/2006 | |
| JP | 2006-329244 A | | 12/2006 | |
| JP | 2007-118696 A | | 5/2007 | |
| JP | 2009-143360 A | | 7/2009 | |
| JP | 2010-167908 A | | 8/2010 | |
| JP | 2010-228498 A | | 10/2010 | |
| JP | 2013082428 A | * | 5/2013 | ............ B60W 10/08 |
| WO | WO-2007049701 A1 | * | 5/2007 | ............ B60K 6/365 |
| WO | 2010/058470 A1 | | 5/2010 | |
| WO | WO-2010058470 A1 | * | 5/2010 | ............ B60K 6/365 |
| WO | 2012/117516 A1 | | 9/2012 | |

OTHER PUBLICATIONS

The extended European search report for the corresponding European application No. 14879560.2, dated Mar. 2, 2017.
The Office Action for the corresponding Japanese application No. 2014-009194, dated Oct. 10, 2017.

* cited by examiner

WORK VEHICLE AND METHOD FOR CONTROLLING WORK VEHICLE

CROSS-REFERENCE TO RELATED APPLICATIONS

This application is a US. National stage application of International Application No. PCT/JP2014/082707, filed on Dec. 10, 2014. This US. National stage application claims priority under 35 U.S.C. § 119(a) to Japanese Patent Application No. 2014-009194, filed in Japan on Jan. 22, 2014, the entire contents of which are hereby incorporated herein by reference.

BACKGROUND

Field of the Invention

The present invention relates to a work vehicle and a method for controlling the work vehicle.

Background Information

A work vehicle provided with a power transmission device (referred to hereinbelow as a "torque converter-type transmission") having a torque converter and a multi-stage speed change gear is well known as a work vehicle, such as a wheel loader. However, recently electric-mechanical transmissions (EMT) have become known as power transmission devices in place of torque converter-type transmissions. As disclosed in Japanese Laid-open Patent 2006-329244, an EMT has a gear mechanism and a motor connected to a rotating element of the gear mechanism, and a portion of the driving power from the engine is converted to hydraulic pressure and transmitted to a travel device, and the remaining portion of the driving power is mechanically transmitted to the travel device.

The EMT is provided with a planetary gear mechanism and an electric motor, for example, to allow continuous speed variation. The first element among the three elements of a sun gear, a carrier, and a ring gear of the planetary gear mechanism is coupled to an input shaft, and the second element is coupled to an output shaft. The third element is coupled to the electric motor. The electric motor functions as either a motor or a generator in response to the travel state of the work vehicle. The EMT is configured to enable stepless changing of the rotation speed of the output shaft by changing the rotation speed of the electric motor.

SUMMARY

In a work vehicle provided with the conventional torque converter type transmission, the rotation speed of the rotating elements of the transmission increases in correspondence to an increase in the vehicle speed. When the rotation speed of the rotating elements increases, torque operates in the direction impeding the increase in the rotation speed due to the moment of inertia of the rotating elements. Therefore, when the vehicle speed increases, the torque caused by the moment of inertia of the rotating elements operates in the direction impeding the increase in the vehicle speed. When the rotation speed of the rotating elements decreases, torque operates in the direction impeding the decrease in the rotation speed due to the moment of inertia of the rotating elements. Therefore, when the vehicle speed decreases, the torque caused by the moment of inertia of the rotating elements operates in the direction impeding the decrease in the vehicle speed.

However, in a work vehicle provided with the EMT, the increase of the rotation speed of the rotating elements is not necessarily brought about in response to the increase in the vehicle speed, and the rotation speed of the rotating elements may decrease in accompaniment to an increase in the vehicle speed. Therefore, the torque caused by the moment of inertia of the rotating elements in the EMT is not limited to increasing in correspondence to an increase in the vehicle speed and may operate in a direction opposite to the conventional torque converter type transmission. Similarly, even when the vehicle speed decreases, the torque caused by the moment of inertia of the rotating elements in the EMT may operate in the direction opposite to the conventional torque converter type transmission. In this case, there is a possibility that a uniform sense of acceleration or sense of deceleration of the vehicle speed may be lost.

Moreover, because the electric motor rotates at a higher speed in comparison to the engine and other rotating elements, the kinetic energy may be great and there may be a large impact on the behavior of the vehicle body due to the moment of inertia. As a result, this may lead to a feeling of unease in the operator.

An object of the present invention is to suppress a feeling of unease in the operator by reducing the impact of the moment of inertia in the EMT of a work vehicle on the behavior of the vehicle body.

A work vehicle according to a first exemplary embodiment of the present invention is equipped with an engine, a hydraulic pump, a work implement, a travel device, a power transmission device, and a control unit. The hydraulic pump is driven by the engine. The work implement is driven by hydraulic fluid discharged from the hydraulic pump. The travel device is driven by the engine. The power transmission device transmits driving power from the engine to the travel device. The control unit controls the power transmission device. The power transmission device has an input shaft, an output shaft, a gear mechanism, and an electric motor. The gear mechanism has a planetary gear mechanism and transmits the rotation of the input shaft to the output shaft. The electric motor is connected to a rotating element of the planetary gear mechanism. The power transmission device is configured to change the rotation speed ratio of the output shaft with respect to the input shaft by changing the rotation speed of the electric motor. The control unit has a target torque determination unit and a target torque correcting unit. The target torque determination unit determines a target torque of the electric motor. The target torque correcting unit corrects the target torque according to a correction torque based on a moment of inertia of the electric motor.

The target torque of the electric motor determined by the target torque determination unit is corrected by the correction torque based on the moment of inertia of the electric motor in the work vehicle according to the present exemplary embodiment. As a result, the impact of the moment of inertia of the power transmission device on the behavior of the vehicle body can be reduced and a feeling of unease in the operator can be suppressed.

The moment of inertia preferably includes a moment of inertia of the rotor of the electric motor and a moment of inertia of the rotating element connected to the electric motor. In this case, the correction torque is determined in consideration of not only the moment of inertia of the rotor of the electric motor but also in consideration of the moment of inertia of the rotating element connected to the electric motor. As a result, the impact of the moment of inertia of the power transmission device on the behavior of the vehicle body can be further reduced in a suitable manner.

The rotation speed of the electric motor is preferably reduced in accordance with an increase in a rotation speed ratio in a range of at least a portion of the rotation speed of the electric motor. In this case, a feeling of unease in the operator can be suppressed in the above-mentioned range of the rotation speed of the electric motor.

The power transmission device preferably further includes a mode-switching mechanism. The mode-switching mechanism selectively switches the transmission path of the driving power in the power transmission device between a plurality of modes including a first mode and a second mode. When the transmission path is in the first mode, the target torque correcting unit corrects the target torque with the correction torque based on a first moment of inertia. The first moment of inertia includes the moment of inertia of the rotating element included in the transmission path in the first mode. When the transmission path is in the second mode, the target torque correcting unit corrects the target torque with the correction torque due to a second moment of inertia. The second moment of inertia includes the moment of inertia of the rotating element included in the transmission path in the second mode. In this case, the suitable moment of inertia is selected in response to the transmission path of the driving power. As a result, the impact of the moment of inertia of the power transmission device on the behavior of the vehicle body can be further reduced in a suitable manner.

The target torque correcting unit preferably determines the correction torque on the basis of a value in which the moment of inertia of the electric motor is multiplied by a predetermined ratio greater than zero and less than one. In this case, stability of the control can be improved even when a delay occurs in the timing for actually generating torque in the electric motor.

The predetermined ratio when the rotation speed of the electric motor increases in response to a decrease in the rotation speed ratio is preferably no less than a predetermined ratio when the rotation speed of the electric motor decreases in response to a reduction in the rotation speed ratio. In this case, the feeling of unease in the operator can be alleviated more effectively.

The power transmission device preferably further includes a mode-switching mechanism. The mode-switching mechanism selectively switches the transmission path of the driving power in the power transmission device between a plurality of modes including a first mode and a second mode. The target torque correcting unit determines the correction torque on the basis of a value in which the moment of inertia of the electric motor is multiplied by a predetermined ratio greater than zero and less than one. The predetermined ratio is determined according to the mode. In this case, a suitable predetermined ratio can be determined according to the transmission path of the driving power. Accordingly, stability of the control can be further improved.

The work vehicle is preferably further provided with a speed change operating member. The speed change operating member is a member for selecting a speed range that defines an upper limit of the vehicle speed. The target torque correcting unit preferably determines the correction torque on the basis of a value in which the moment of inertia of the electric motor is multiplied by a predetermined ratio greater than zero and less than one. The predetermined ratio is determined according to the speed range selected with the speed change operating member. In this case, the predetermined ratio is suitably determined according to the speed range selected with the speed change operating member. Accordingly, stability of the control can be further improved.

The target torque correcting unit preferably does not perform the correction of the target torque when a first speed is selected with the speed change operating member. When the first speed is selected, the rotation speed of the electric motor often fluctuates to a large degree. Therefore, control can be stabilized by not performing the correction based on the moment of inertia when the first speed is selected.

The work vehicle is preferably further provided with a forward/reverse travel operating member. The forward/reverse travel operating member is a member for selectively switching between at least a forward travel position and a reverse travel position to switch between forward travel and reverse travel of the vehicle. The control unit further includes a shuttle action evaluating unit. The shuttle action evaluating unit evaluates whether the vehicle is in a shuttle action when the direction corresponding to the position of the forward/reverse travel operating member differs from the travel direction of the vehicle. The target torque correcting unit determines the correction torque on the basis of a value in which the moment of inertia of the electric motor is multiplied by a predetermined ratio greater than zero and less than one. The predetermined ratio is determined in response to whether or not the work vehicle is in a shuttle action. In this case, the predetermined ratio is suitably determined in response to whether or not the work vehicle is in a shuttle action. Accordingly, stability of the control can be further improved.

The work vehicle is preferably further provided with an accelerator operating member. The control unit further has a transmission requirement determination unit. The transmission requirement determination unit determines, on the basis of an operating amount of the accelerator operating member, a required tractive force that is a target tractive force of the travel device. The target torque determination unit determines the target torque of the electric motor so that the tractive force of the work vehicle becomes the required tractive force. In this case, the tractive force of the work vehicle can be controlled accurately due to the target torque of the electric motor being corrected with the correction torque based on the moment of inertia of the electric motor.

The target torque correcting unit preferably determines the correction torque on the basis of a value in which the moment of inertia of the electric motor is multiplied by a predetermined ratio greater than zero and less than one. The target torque correcting unit corrects the target torque by adding the correction torque to the target torque. In this case, at least a portion of the torque based on the moment of inertia of the power transmission device is canceled out by the correction torque. As a result, the impact of the moment of inertia of the power transmission device on the behavior of the vehicle body can be reduced and the feeling of unease in the operator can be suppressed.

A control method for a work vehicle according to another exemplary embodiment of the present invention is a control method for a work vehicle equipped with an engine, a hydraulic pump, a work implement, a travel device, and a power transmission device. The hydraulic pump is driven by the engine. The work implement is driven by hydraulic fluid discharged from the hydraulic pump. The travel device is driven by the engine. The power transmission device transmits driving power from the engine to the travel device. The power transmission device has an input shaft, an output shaft, a gear mechanism, and an electric motor. The gear mechanism has a planetary gear mechanism and transmits the rotation of the input shaft to the output shaft. The electric motor is connected to a rotating element of the planetary gear mechanism. The power transmission device is configured to change the rotation speed ratio of the output shaft with respect to the input shaft by changing the rotation speed of the electric motor. The control method for according to the present exemplary embodiment includes a first step and a second step. A target torque of the electric motor is determined in a first step. The target torque is corrected with the correction torque based on the moment of inertia of the electric motor in the second step.

In the control method of the work vehicle according to the present exemplary embodiment, the target torque of the electric motor determined in the first step is corrected with the correction torque based on the moment of inertia of the electric motor in the second step. As a result, the impact of the moment of inertia of the power transmission device on the behavior of the vehicle body can be reduced and the feeling of unease in the operator can be suppressed.

According to exemplary embodiment of the present invention, a feeling of unease in the operator is suppressed by reducing the impact of the moment of inertia in the EMT of a work vehicle on the behavior of the vehicle body.

DESCRIPTION OF EXEMPLARY EMBODIMENTS

Figure 1:
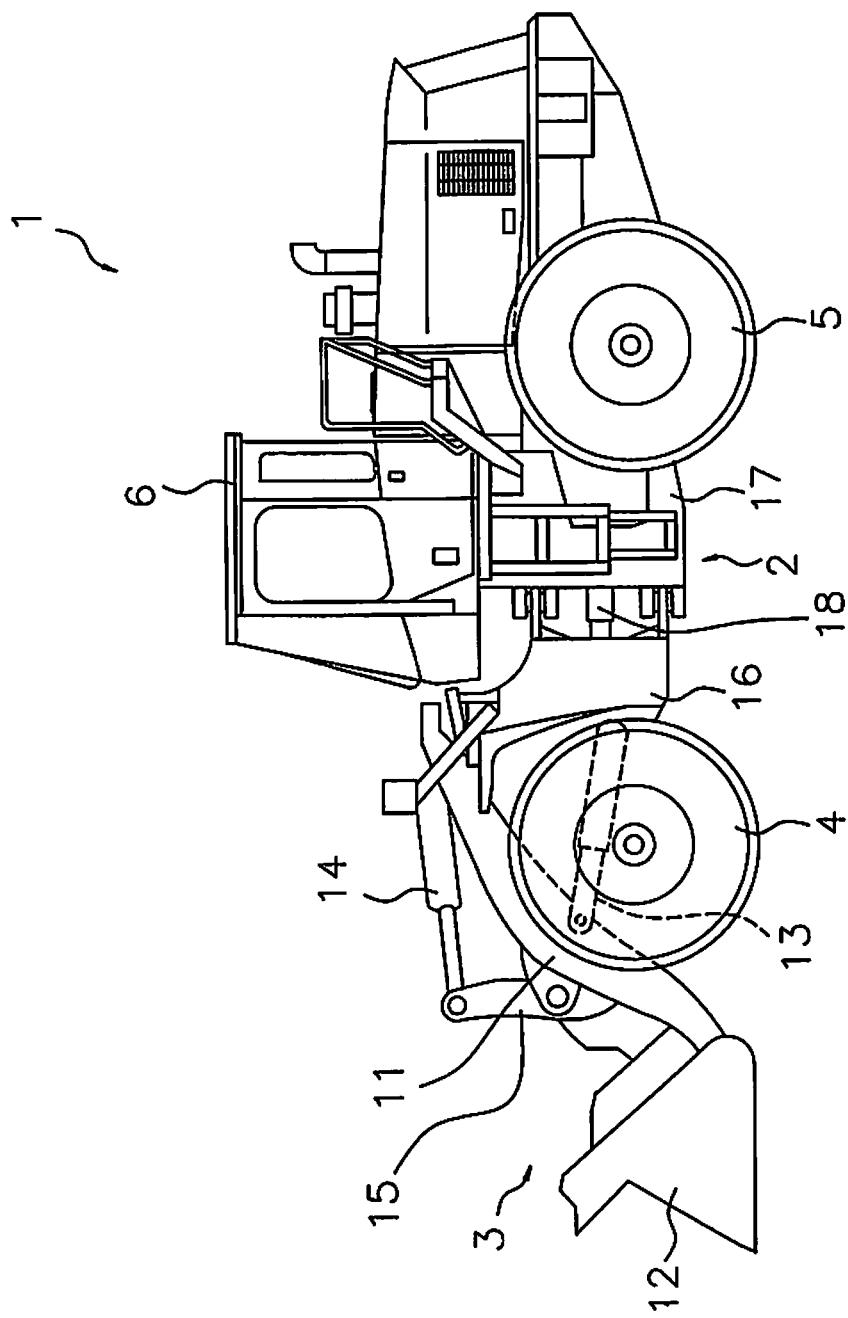
FIG. 1 is a side view of a work vehicle according to an exemplary embodiment of the present invention.

Exemplary embodiments of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work, such as excavation, by using the work implement 3.

The work implement 3 and the traveling wheels 4 and 5 are attached to the vehicle body frame 2. The work implement 3 is driven by hydraulic fluid from a below-mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 with hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 with hydraulic fluid from the work implement pump 23.

The operating cabin 6 is attached to the vehicle body frame 2. The operating cabin 6 is mounted on the vehicle body frame 2. A seat for the operator, a below-mentioned operating device and so on are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the advancing direction to the right and left with the extension and contraction of the steering cylinder 18 due to hydraulic fluid from a below-mentioned steering pump 30.

Figure 2:
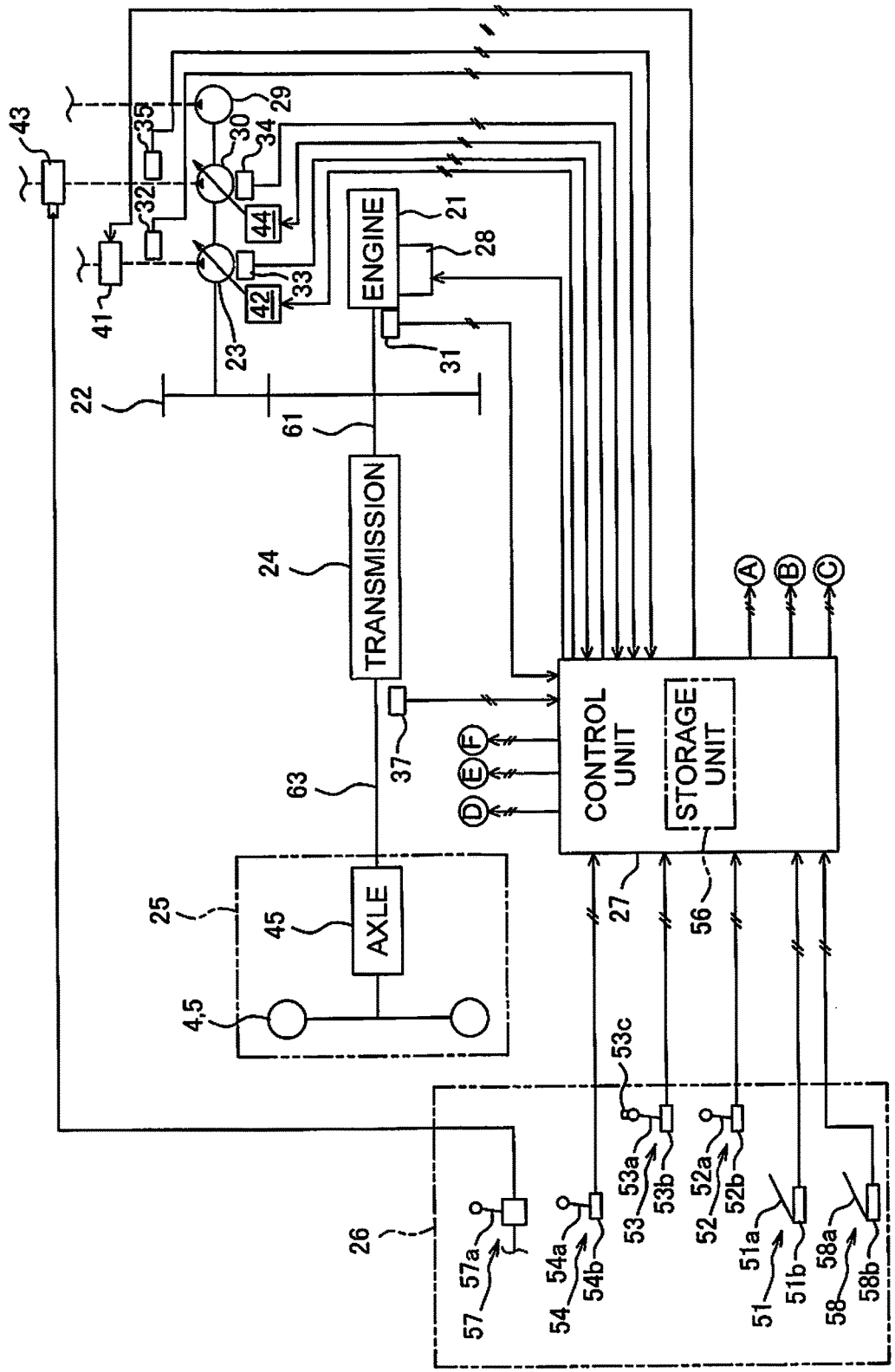
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a power take-off device PTO) 22, a power transmission device 24, a travel device 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is conducted by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 has the work implement pump 23, the steering pump 30, and a transmission pump 29. The work implement pump 23, the steering pump 30, and the transmission pump 29 are hydraulic pumps. The PTO 22 transmits a portion of the driving power from the engine 21 to the hydraulic pumps 23, 30, and 29. That is, the PTO 22 distributes the driving power from the engine 21 to the power transmission device 24 and the hydraulic pumps 23, 30, and 29.

The work implement pump 23 is driven by driving power from the engine 21. Hydraulic fluid discharged from the work implement pump 23 is supplied to the lift cylinder 13 and the bucket cylinder 14 through a work implement control valve 41. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge capacity of the work implement pump 23 is changed by changing the tilt angle of a skew plate or an inclined shaft of the work implement pump 23. A first capacity control device 42 is connected to the work implement pump 23. The first capacity control device 42 is controlled by the control unit 27 and changes the tilt angle of the work implement pump 23. As a result, the discharge capacity of the work implement pump 23 is controlled by the control unit 27. The work vehicle 1 is equipped with a first tilt angle detecting unit 33. The first tilt angle detecting unit 33 detects the tilt angle of the work implement pump 23 and transmits a detection signal indicating the tilt angle to the control unit 27.

The steering pump 30 is driven by driving power from the engine 21. Hydraulic fluid discharged from the steering pump 30 is supplied to the above-mentioned steering cylinder 18 through a steering control valve 43. The work vehicle 1 is equipped with a steering pump pressure detecting unit 35. The steering pump pressure detecting unit 35 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge capacity of the steering pump 30 is changed by changing the tilt angle of a skew plate or an inclined shaft of the steering pump 30. A second capacity control device 44 is connected to the steering pump 30. The second capacity control device 44 is controlled by the control unit 27 and changes the tilt angle of the steering pump 30. As a result, the discharge capacity of the steering pump 30 is controlled by the control unit 27. The work vehicle 1 is equipped with a second tilt angle detecting unit 34. The second tilt angle detecting unit 34 detects the tilt angle of the steering pump 30 and transmits a detection signal indicating the tilt angle to the control unit 27.

The transmission pump 29 is driven by driving power from the engine 21. The transmission pump 29 is a fixed displacement hydraulic pump. Hydraulic fluid discharged from the transmission pump 29 is supplied to clutches CF, CR, CL, and CH of the power transmission device 24 via below mentioned clutch control valves VF, VR, VL, and VH.

The PTO 22 transmits a portion of the driving power from the engine 21 to the power transmission device 24 through an input shaft 61. The power transmission device 24 transmits the driving power from the engine 21 to the travel device 25. The power transmission device 24 changes the speed and outputs the driving power from the engine 21. An explanation of the configuration of the power transmission device 24 is provided in detail below.

The travel device 25 has an axle 45 and the traveling wheels 4 and 5. The axle 45 transmits driving power from the power transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 functions as a traveling direction detecting unit that detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by an operator. The operating device 26 has an accelerator operating device 51, a work implement operating device 52, a speed change operating device 53, a forward/reverse travel operating device 54 (referred to below as "FR operating device 54"), a steering operating device 57, and a brake operating device 58.

The accelerator operating device 51 has an accelerator operating member 51a and an accelerator operation detecting unit 51b. The accelerator operating member 51a is operated to set a target rotation speed of the engine 21. The accelerator operation detecting unit 51b detects an operating amount (referred to below as "accelerator operating amount") of the accelerator operating member 51a. The accelerator operation detecting unit 51b transmits a detection signal indicating the accelerator operating amount to the control unit 27.

The work implement operating device 52 has a work implement operating member 52a and a work implement operation detecting unit 52b. The work implement operating member 52a is operated to actuate the work implement 3. The work implement operation detecting unit 52b detects a position of the work implement operating member 52a. The work implement operation detecting unit 52b outputs a detection signal indicating the position of the work implement operating member 52a to the control unit 27. The work implement operation detecting unit 52b detects the operating amount of the work implement operating member 52a by detecting the position of the work implement operating member 52a.

The speed change operating device 53 has a speed change operating member 53a and a speed change operation detecting unit 53b. The operator is able to select a speed range of the power transmission device 24 by operating the speed change operating member 53a. The speed change operation detecting unit 53b detects the position of the speed change operating member 53a. The position of the speed change operating member 53a corresponds to a plurality of speed ranges such as a first speed and a second speed and the like. In the present exemplary embodiment, a speed range from the first speed to a fourth speed can be selected with the speed change operating member 53a. However, the selectable speed ranges are not limited to four and there may be three or less or five or more speed ranges. The speed change operation detecting unit 53b outputs a detection signal indicating the position of the speed change operating member 53a to the control unit 27. The speed change operating member 53a may have a kick-down switch 53c. When the kick-down switch 53c is pressed, the speed range of the power transmission device 24 is shifted to a speed range lower than the currently selected speed range. When the kick-down switch 53c is pressed, the speed change operation detecting unit 53b outputs a detection signal to the control unit 27.

The FR operating device 54 has a forward/reverse travel operating member 54a (referred to below as "FR operating member 54a") and a forward/reverse travel position detecting unit 54b (referred to below as a "FR position detecting unit 54b"). The operator can switch between forward and reverse travel of the work vehicle 1 by operating the FR operating member 54a. The FR operating member 54a is selectively switched between a forward travel position (F), a neutral position (N), and a reverse travel position (R). The FR position detecting unit 54b detects the position of the FR operating member 54a. The FR position detecting unit 54b outputs a detection signal indicating the position of the FR operating member 54a to the control unit 27.

The steering operating device 57 has a steering operating member 57a. The steering operating device 57 drives the steering control valve 43 by supplying pilot hydraulic pressure based on an operation of the steering operating member 57a to the steering control valve 43. The steering operating device 57 may drive the steering control valve 43 by converting an operation of the steering operating member 57a to an electrical signal. The operator is able to change the travel direction of the work vehicle 1 to the right or left by operating the steering operating member 57a.

The brake operating device 58 has a brake operating member 58a and a brake operation detecting unit 58b. The operator is able to operate a deceleration force of the work vehicle 1 by operating the brake operating member 58a. The brake operation detecting unit 58b detects an operating amount of the brake operating member 58a (referred to below as "brake operating amount"). The brake operation detecting unit 58b outputs a detection signal indicating the brake operating amount to the control unit 27. The pressure of the brake oil may be used as the brake operating amount.

The control unit 27 has a calculation device, such as a central processing unit (CPU), and a memory, such as a RAM or a ROM, and conducts processing for controlling the work vehicle 1. The control unit 27 has a storage unit 56. The storage unit 56 stores programs and data for controlling the work vehicle 1.

The control unit 27 transmits a command signal indicating a command throttle value to the fuel injection device 28 so that a target rotation speed of the engine 21 is obtained in accordance with the accelerator operating amount. The control of the engine 21 by the control unit 27 is described in detail below.

The control unit 27 controls hydraulic pressure supplied to the hydraulic cylinders 13 and 14 by controlling the work implement control valve 41 on the basis of the detection signals from the work implement operation detecting unit 52b. As a result, the hydraulic cylinders 13 and 14 expand or contract to operate the work implement 3.

The control unit 27 controls the power transmission device 24 on the basis of the detection signals from each of the detecting units. The control of the power transmission device 24 by the control unit 27 is described in detail below.

Figure 3:
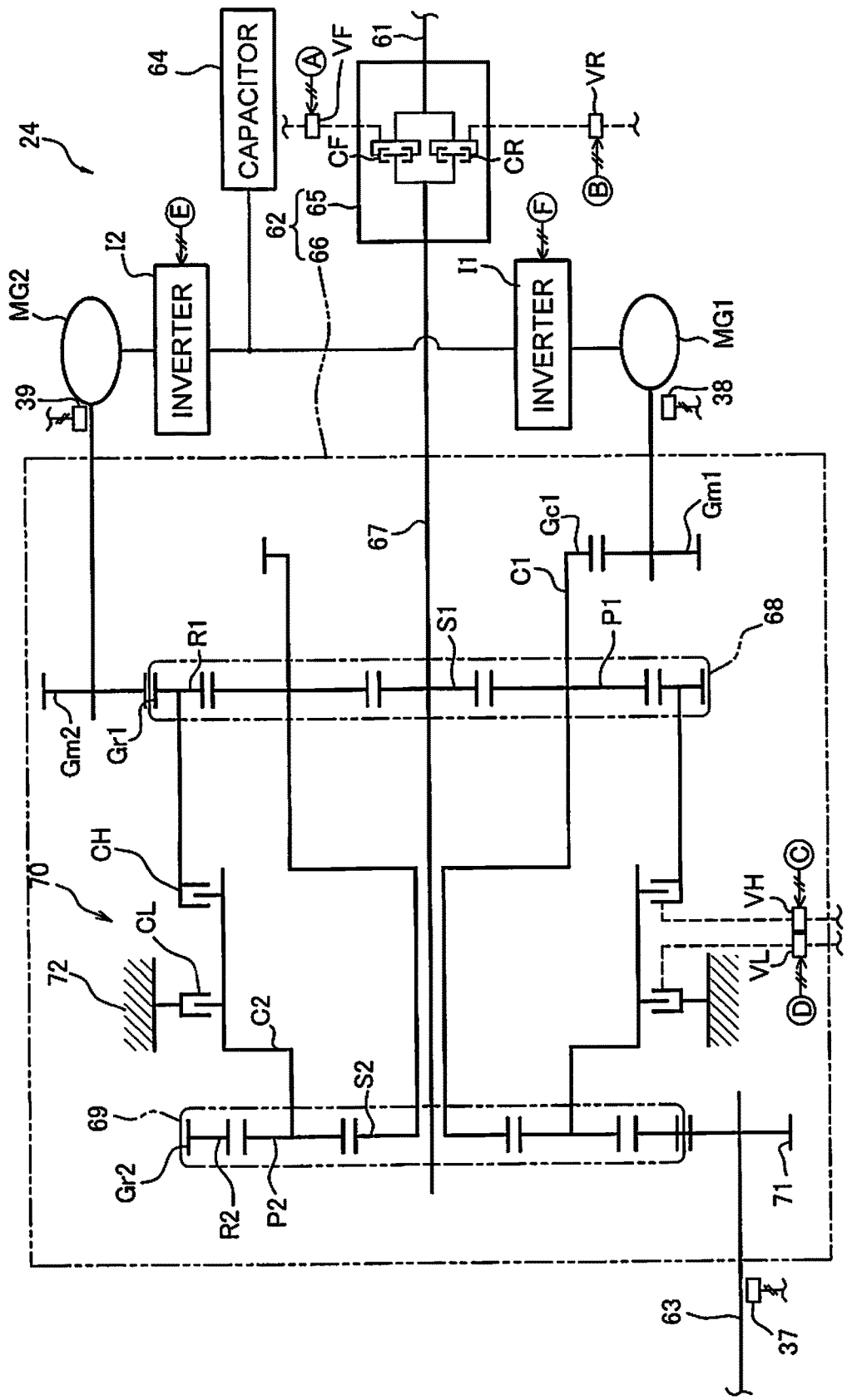
FIG. 3 is a schematic view of a configuration of a power transmission device.

Next, a detailed explanation of the configuration of the power transmission device 24 is provided. FIG. 3 is a schematic view of a configuration of the power transmission device 24. As illustrated in FIG. 3, the power transmission device 24 is provided with the input shaft 61, a gear mechanism 62, the output shaft 63, a first motor MG1, a second motor MG2, and a capacitor 64. The input shaft 61 is connected to the above-mentioned PTO 22. The rotation from the engine 21 is inputted to the input shaft 61 via the PTO 22. The gear mechanism 62 transmits the rotation of the input shaft 61 to the output shaft 63. The output shaft 63 is connected to the above-mentioned travel device 25, and transmits the rotation from the gear mechanism 62 to the above-mentioned travel device 25.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1 and MG2. The gear mechanism 62 has a FR switch mechanism 65 and a speed change mechanism 66.

The FR switch mechanism 65 has a forward travel clutch CF (referred to below as "F-clutch CF"), a reverse travel clutch CR (referred to below as "R-clutch CR"), and various other gears which are not illustrated. The F-clutch CF and the R-clutch CR are hydraulic clutches and hydraulic fluid is supplied from the transmission pump 29 to the clutches CF and CR. The hydraulic fluid for the F-clutch CF is controlled by the F-clutch control valve VF. The hydraulic fluid for the R-clutch CR is controlled by the R-clutch control valve VR. The clutch control valves CF and CR are controlled by command signals from the control unit 27.

The direction of the rotation outputted from the FR switch mechanism 65 is switched due to the switching between connected/disconnected states of the F-clutch CF and disconnected/connected states of the R-clutch CR. Specifically, the F-clutch CF is connected and the R-clutch CR is disconnected when the vehicle is traveling forward. The F-clutch CF is disconnected and the R-clutch CR in connected when the vehicle is traveling in reverse.

The speed change mechanism 66 has a transmission shaft 67, a first planetary gear mechanism 68, a second planetary gear mechanism 69, a mode-switching mechanism 70, and an output gear 71. The transmission shaft 67 is coupled to the FR switch mechanism 65. The first planetary gear mechanism 68 and the second planetary gear mechanism 69 are disposed on the same axis as the transmission shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The mode-switching mechanism 70 is a mechanism for switching the driving power transmission path of the power transmission device 24 between a first mode (Lo mode) in which the vehicle speed is low and a second mode (Hi mode) in which the vehicle speed is high. The mode-switching mechanism 70 has the H-clutch CH that is connected during the Hi mode and the L-clutch CL that is connected during the Lo mode. The H-clutch CH connects or disconnects the first ring gear R1 and the second carrier C2. The L-clutch CL connects or disconnects the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the H-clutch CH is controlled by an H-clutch control valve VH. The hydraulic fluid for the L-clutch CL is controlled by an L-clutch control valve VL. The clutch control valves VH and VL are controlled by command signals from the control unit 27.

The first motor MG1 and the second motor MG2 function as drive motors that generate driving power using electrical energy. The first motor MG1 and the second motor MG2 also function as generators that use inputted driving power to generate electrical energy. The first motor MG1 functions as a generator when a command signal from the control unit 27 is applied to activate torque in the reverse direction of the rotating direction of the first motor MG1. A first motor gear Gm1 is fixed to the output shaft of the first motor MG1 and the first motor gear Gm1 meshes with the first carrier gear Gc1. A first inverter I1 is connected to the first motor MG1 and a command signal for controlling the motor torque of the first motor MG1 is applied to the first inverter I1 from the control unit 27. The rotation speed of the first motor MG1 is detected by a first motor rotation speed detecting unit 38.

The second motor MG2 is configured in the same way as the first motor MG1. A second motor gear Gm2 is fixed to the output shaft of the second motor MG2 and the second motor gear Gm2 meshes with the first ring outer periphery gear Gr1. A second inverter I2 is connected to the second motor MG2 and a command signal for controlling the motor torque of the second motor MG2 is applied to the second inverter I2 from the control unit 27. The rotation speed of the second motor MG2 is detected by a second motor rotation speed detecting unit 39.

The capacitor 64 functions as an energy reservoir unit for storing energy generated by the motors MG1 and MG2. That is, the capacitor 64 stores electrical power generated by the motors MG1 and MG2 when the total electrical power generation amount of the motors MG1 and MG2 is high. The capacitor 64 releases electrical power when the total electrical power consumption amount of the motors MG1 and MG2 is high. That is, the motors MG1 and MG2 are driven by electrical power stored in the capacitor 64. Alternatively, the motors MG1 and MG2 can drive using the electrical power stored in the capacitor 64. A battery may be used as another electrical power storage means in place of the capacitor.

The control unit 27 receives detection signals from the various detecting units and applies command signals for indicating the command torques for the motors MG1 and MG2 to the inverters I1 and I2. The control unit 27 may output rotation speed commands to the motors MG1 and MG2. In this case, the inverters I1 and I2 control the motors MG1 and MG2 by calculating command torques corresponding to the rotation speed commands. The control unit 27 also applies command signals for controlling the clutch hydraulic pressure of the clutches CF, CR, CH, and CL to the clutch control valves VF, VR, VH, and VL. As a result, the speed change ratio and the output torque of the power transmission device 24 are controlled. The following is an explanation of the operations of the power transmission device 24.

Figure 4:
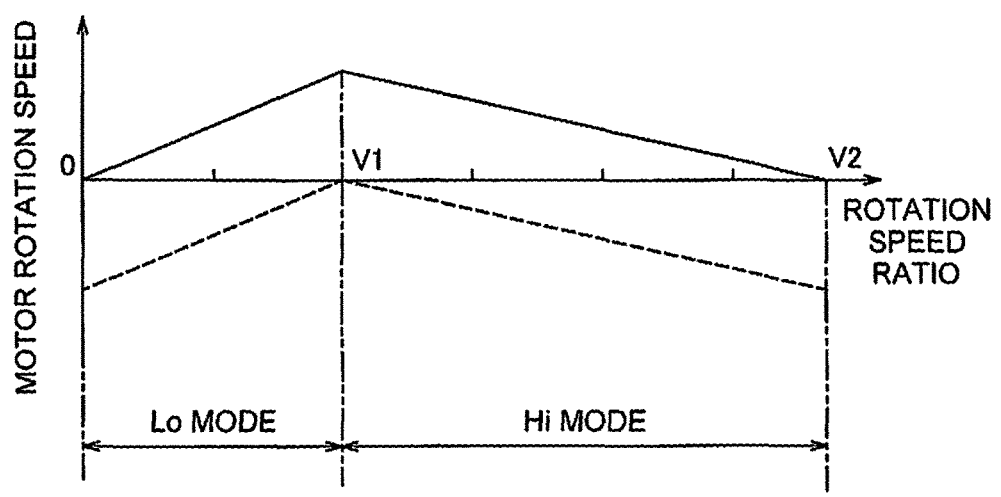
FIG. 4 illustrates changes in the rotation speeds of a first motor and a second motor with respect to a rotation speed ratio of the power transmission device.

An outline of operations of the power transmission device 24 when the vehicle speed increases from zero in the forward travel side while the rotation speed of the engine 21 remains fixed, will be explained with reference to FIG. 4. FIG. 4 depicts the rotation speeds of the motors MG1 and MG2 in relation to the rotation speed ratio of the power transmission device 24. The rotation speed ratio of the power transmission device 24 is the ratio of the rotation speed of the output shaft 63 with respect to the rotation speed of the input shaft 61. When the rotation speed of the engine 21 is fixed, the vehicle speed changes in response to the rotation speed ratio of the power transmission device 24. Therefore, a change in the rotation speed ratio in FIG. 4 matches a change in the vehicle speed. That is, FIG. 4 illustrates the relationship between the vehicle speed and the rotation speeds of the motors MG1 and MG2. The solid line in FIG. 4 represents the rotation speed of the first motor MG1, and the dashed line represents the rotation speed of the second motor MG2. The rotation speeds of the motors MG1 and MG2 on the vertical axis in FIG. 4 may be a ratio of the rotation speeds of the motors MG1 and MG2 with respect to the rotation speed of the engine 21.

The L-clutch CL is connected and the H-clutch CH is disconnected in a region (Lo mode) where the rotation speed ratio increases from zero to V1. Because the H-clutch CH is disconnected in the Lo mode, the second carrier C2 and the first ring gear 1 are disconnected. Because the L-clutch CL is connected, the second carrier C2 is fixed.

The driving power from the engine 21 in the Lo mode is inputted to the first sun gear 1 via the transmission shaft 67, and the driving power is outputted from the first carrier C1 to the second sun gear 2. Conversely, the driving power inputted to the first sun gear 1 is transmitted from the first planet gears P1 to the first ring gear 1 and outputted through the first ring outer periphery gear Gr1 and the second motor gear m2 to the second motor MG2. The second motor MG2 functions mainly as a generator in the Lo mode, and the electrical power generated by the second motor MG2 is supplied to the first motor MG1 or a portion of the generated electrical power is stored in the capacitor 64. A portion of the electrical power generated by the second motor MG2 is consumed in the driving of the first motor MG1.

The first motor MG1 functions mainly as an electric motor in the Lo mode. The driving power of the first motor MG1 is outputted to the second sun gear 2 along a path from the first motor gear m1 to the first carrier gear Gc1 to the first carrier C1. At this time, the electrical power for driving the first motor MG1 is supplied from the second motor MG2 or from the capacitor 64 as needed. The driving power outputted to the second sun gear 2 as described above is transmitted to the output shaft 63 along a path from the second planet gears P2 to the second ring gear 2 to the second ring outer periphery gear Gr2 to the output gear 1.

The rotation speed of the first motor MG1 increases in correspondence to the increase in the rotation speed ratio in the Lo mode. The rotation speed of the second motor MG2 decreases in correspondence to the increase in the rotation speed ratio in the Lo mode. The increase and decrease of the rotation speeds in this way means that the absolute values of the rotation speeds increase and decrease.

The H-clutch CH is connected and the L-clutch CL is disconnected in the region where the vehicle speed exceeds V1 (Hi mode). Because the H-clutch CH is connected in the Hi mode, the second carrier C2 and the first ring gear 1 are connected. Because the L-clutch CL is disconnected, the second carrier C2 is disconnected. Therefore, the rotation speeds of the first ring gear 1 and the second carrier C2 match.

The driving power from the engine 21 in the Hi mode is inputted to the first sun gear 1 and the driving power is outputted from the first carrier C1 to the second sun gear S2. The driving power inputted to the first sun gear 1 is outputted from the first carrier C1 through the first carrier gear Gc1 and the first motor gear m1 to the first motor MG1. The first motor MG1 functions mainly as a generator in the Hi mode, and thus the electrical power generated by the first motor MG1 is supplied to the second motor MG2 and a portion of the electrical power generated by the first motor MG1 is stored in the capacitor 64. A portion of the electrical power generated by the first motor MG1 is consumed in the driving of the second motor MG2.

The driving power of the second motor MG2 is outputted to the second carrier C2 along a path from the second motor gear m2 to the first ring outer periphery gear Gr1 to the first ring gear 1 to the H-clutch CH. At this time, the electrical power for driving the second motor MG2 is supplied from the first motor MG1 or from the capacitor 64 as needed. The driving power outputted to the second sun gear 2 as described above is outputted through the second planet gears P2 to the second ring gear 2, and the driving power outputted to the second carrier C2 is outputted through the second planet gears P2 to the second ring gear 2. The driving power combined by the second ring gear 2 in this way is transmitted through the second ring outer periphery gear Gr2 and the output gear 1 to the output shaft 63.

The rotation speed of the first motor MG1 decreases in correspondence to the increase in the rotation speed ratio in the Hi mode. The rotation speed of the second motor MG2 increases in correspondence to the increase in the rotation speed ratio in the Hi mode. The increase and decrease of the rotation speeds in this way means that the absolute values of the rotation speeds increase and decrease.

While forward travel driving has been discussed above, the operations of reverse travel driving are the same. During braking, the roles of the first motor MG1 and the second motor MG2 as generator and motor are reversed from the above explanation.

The control of the power transmission device 24 by the control unit 27 is described in detail below. The control unit 27 controls the output torque of the power transmission device 24 by controlling the motor torque of the first motor MG1 and the second motor MG2. That is, the control unit 27 controls the tractive force of the work vehicle 1 by controlling the motor torque of the first motor MG1 and the second motor MG2.

Figure 5:
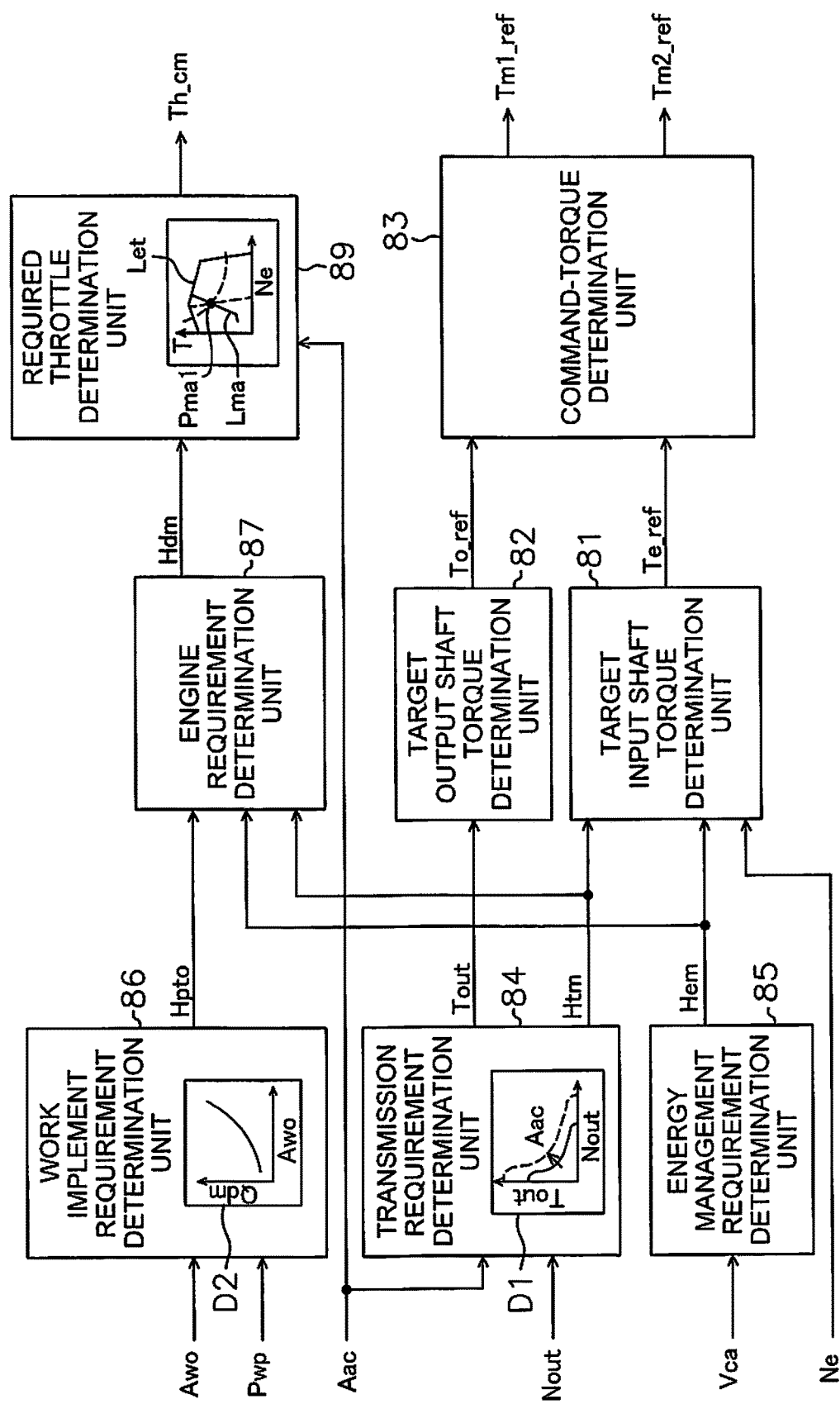
FIG. 5 is a control block diagram illustrating processing executed by the control unit.

First, a method for determining the command values (referred to below as "command torques") of the motor torques to the first motor MG1 and the second motor MG2 is explained below. FIG. 5 is a control block diagram illustrating processing executed by the control unit 27. The control unit 27 has a transmission requirement determination unit 84, an energy management requirement determination unit 85, and a work implement requirement determination unit 86 as illustrated in FIG. 5.

The transmission requirement determination unit 84 determines a required tractive force Tout on the basis of an accelerator operating amount Aac and an output rotation speed Nout. Specifically, the transmission requirement determination unit 84 determines the required tractive force Tout from the output rotation speed Nout on the basis of required tractive force characteristics information D1 stored in the storage unit 56. The required tractive force characteristics information D1 is data indicating the required tractive force characteristics for defining the relationship between the output rotation speed Nout and the required tractive force Tout. The required tractive force characteristics are changed in response to the accelerator operating amount. The required tractive force characteristics correspond to predetermined vehicle speed-tractive force characteristics. The transmission requirement determination unit 84 uses the required tractive force characteristics corresponding to the accelerator operating amount to determine the required tractive force Tout from the output rotation speed Nout and to determine a transmission required horsepower Htm that is a product of the output rotation speed Nout and the required tractive force Tout.

Figure 6:
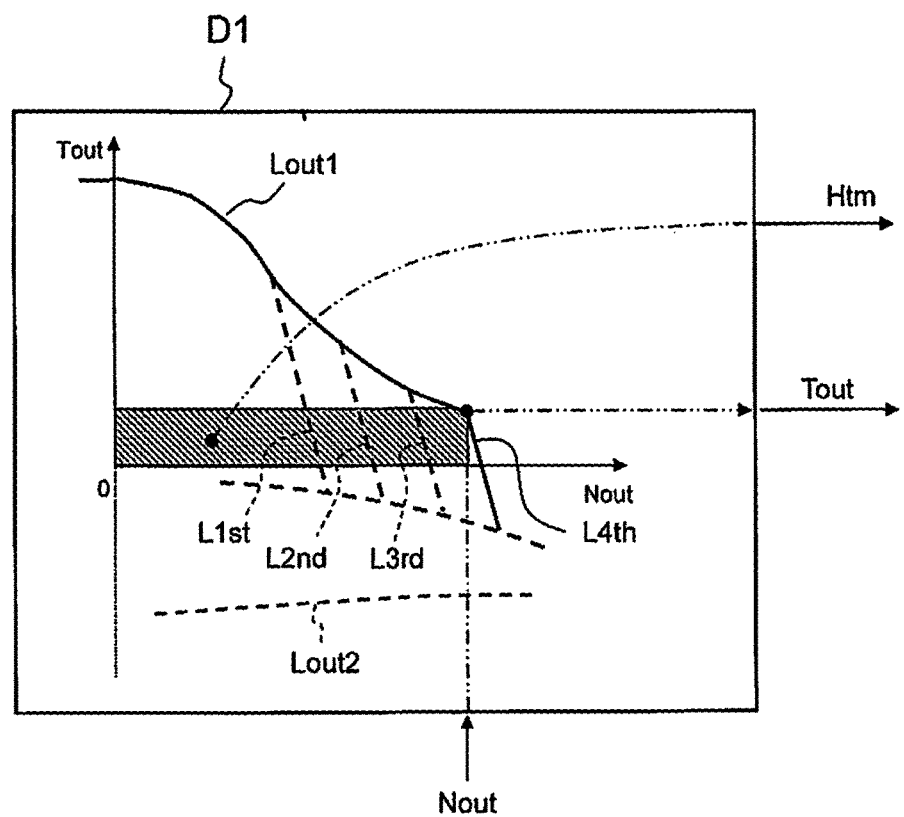
FIG. 6 is a graph illustrating an example of required tractive force characteristics.

Specifically, as illustrated in FIG. 6, the storage unit 56 stores data Lout1 (referred to below as "basic tractive force characteristics Lout1") indicating basic required tractive force characteristics. The basic tractive force characteristics Lout1 are required tractive force characteristics when the accelerator operating amount Aac is at the maximum value, that is, at 100%. The transmission requirement determination unit 84 determines current required tractive force characteristics by multiplying the basic tractive force characteristics Lout1 by a predetermined ratio corresponding to the accelerator operating amount Aac.

The basic tractive force characteristics Lout1 are determined according to the speed range selected by the speed change operating member 53a. In FIG. 6, L1st depicts the tractive force characteristics when the speed range is the first speed. L2nd depicts the tractive force characteristics when the speed range is the second speed. L3rd depicts the tractive force characteristics when the speed range is the third speed. L4th depicts the tractive force characteristics when the speed range is the fourth speed.

When the work vehicle 1 is in a shuttle action, the transmission requirement determination unit 84 determines the required tractive force Tout from the output rotation speed Nout on the basis of tractive force characteristics Lout2 for the shuttle action. The shuttle action signifies a state in which the direction corresponding to the position of the FR operating member 54a differs from the traveling direction of the vehicle. The above-mentioned basic tractive force characteristics Lout1 signify that the work vehicle 1 is not in the shuttle action, that is, signify a normal state of the tractive force characteristics when the direction corresponding to the position of the FR operating member 54a matches the traveling direction of the vehicle. As illustrated in FIG. 6, the tractive force characteristics Lout2 for the shuttle action defines a negative tractive force. Therefore, a deceleration force with respect to the traveling direction of the work vehicle 1 can be generated due to the required tractive force Tout being determined on the basis of the tractive force characteristics Lout2 for the shuttle action.

The energy management requirement determination unit 85 determines an energy management required horsepower Hem on the basis of the remaining amount of electrical power in the capacitor 64. The energy management required horsepower Hem is the horsepower required by the power transmission device 24 for charging the capacitor 64. The energy management requirement determination unit 85 determines a current capacitor charge capacity from a voltage Vca of the capacitor 64. The energy management requirement determination unit 85 increases the energy management required horsepower Hem as the current capacitor charge capacity becomes smaller.

The work implement requirement determination unit 86 determines a work implement required horsepower Hpto on the basis of a work implement pump pressure Pwp and an operating amount Awo (referred to below as "work implement operating amount Awo") of the work implement operating member 52a. In the present exemplary embodiment, the work implement required horsepower Hpto is the horsepower distributed to the work implement pump 23. However, the work implement required horsepower Hpto may be the horsepower distributed to the steering pump 30 and/or the transmission pump 29. Specifically, the work implement requirement determination unit 86 determines a required flow rate Qdm of the work implement pump 23 from the work implement operating amount Awo on the basis of required flow rate information D2. The required flow rate information D2 is stored in the storage unit 56 and uses a map or a calculation formula to define the relationship between the required flow rate Qdm and the work implement operating amount Awo. The work implement requirement determination unit 86 determines the work implement required horsepower Hpto from the required flow rate Qdm and the work implement pump pressure Pwp.

The control unit 27 has a target output shaft torque determination unit 82, a target input shaft torque determination unit 81, and a command-torque determination unit 83.

The target output shaft torque determination unit 82 determines a target output shaft torque To_ref. The target output shaft torque To_ref is a target value for the torque to be outputted from the power transmission device 24. The target output shaft torque determination unit 82 determines the target output shaft torque To_ref on the basis of the required tractive force Tout determined by the transmission requirement determination unit 84. Specifically, the target output shaft torque To_ref is determined by multiplying the required tractive force Tout by a predetermined distribution ratio. The predetermined distribution ratio is set, for example, so that the total of the work implement required horsepower Hpto, the transmission required horsepower Htm, and the energy management required horsepower Hem does not exceed the output horsepower from the engine 21.

The target input shaft torque determination unit 81 determines a target input shaft torque Te_ref. The target input shaft torque Te_ref is a target value for the torque to be inputted to the power transmission device 24. The target input shaft torque determination unit 81 determines the target input shaft torque Te_ref on the basis of the transmission required horsepower Htm and the energy management required horsepower Hem. Specifically, the target input shaft torque determination unit 81 calculates the target input shaft torque Te_ref by multiplying the engine rotation speed Ne by the sum of the energy management required horsepower Hem and the value of the transmission required horsepower Htm multiplied by a predetermined distribution ratio. The transmission required horsepower Htm is calculated by multiplying the above-mentioned required tractive force Tout by the current output rotation speed Nout.

Figure 7:
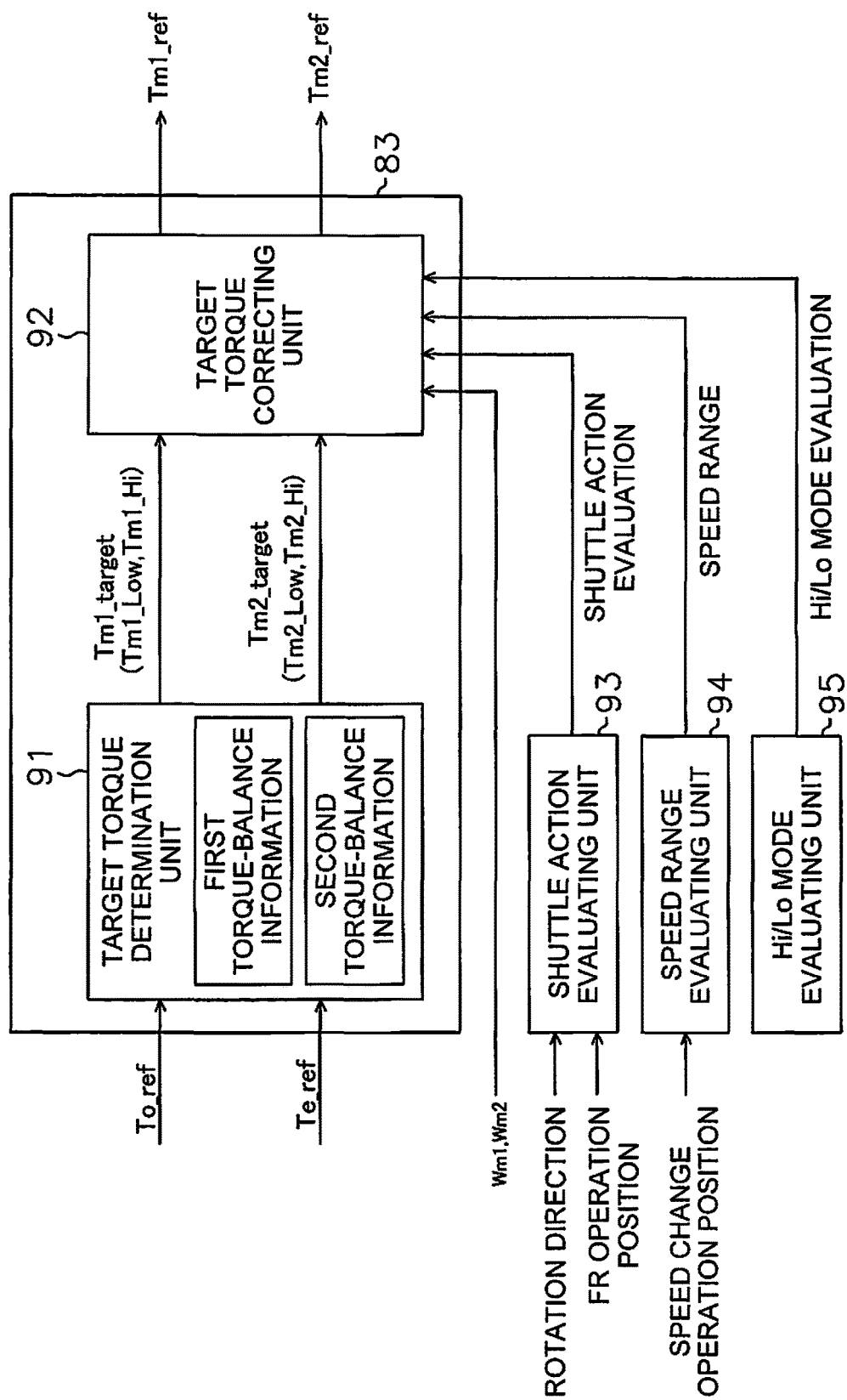
FIG. 7 is a control block diagram illustrating processing to determine a command torque executed by a command-torque determination unit.

The command-torque determination unit 83 determines command torques Tm1_ref and Tm2_ref to the motors MG1 and MG2 from the target input shaft torque Te_ref and the target output shaft torque To_ref. Specifically, as illustrated in FIG. 7, the command-torque determination unit 83 has a target torque determination unit 91 and a target torque correcting unit 92. The target torque determination unit 91 uses the torque-balance information to determine target torques Tm1_target and Tm2_target to the motors MG1 and MG2 from the target input shaft torque Te_ref and the target output shaft torque To_ref. The torque-balance information defines a relationship between the target input shaft torque Te_ref and the target output shaft torque To_ref so as to achieve a balance among the torques of the power transmission device 24. The torque-balance information is stored in the storage unit 56.

As described above, the transmission paths of the driving power in the power transmission device 24 are different for the Lo mode and the Hi mode. As a result, the target torque determination unit 91 uses different torque-balance information to determine the target torques Tm1_target and Tm2_target for the motors MG1 and MG2 in the Lo mode and the Hi mode. Specifically, the target torque determination unit 91 uses first torque-balance information depicted by equation 1 below to determine target torques Tm1_Low and Tm2_Low for the motors MG1 and MG2 in the Lo mode. In the present exemplary embodiment, the first torque-balance information is an equation for balancing the torques of the power transmission device 24.

$Ts1\_Low = Te\_ref * r\_fr$ $Tc1\_Low = Ts1\_Low * (-1) * ((Zr1/Zs1)+1)$ $Tr2\_Low = To\_ref * (Zod/Zo)$ $Ts2\_Low = Tr2\_Low * (Zs2/Zr2)$ $Tcp1\_Low = Tc1\_Low + Ts2\_Low$ $Tm1\_Low = Tcp1\_Low * (-1) * (Zp1/Zp1d)$ $Tr1\_Low = Ts1\_Low * (Zr1/Zs1)$ $$Tm2\_Low = Tr1\_Low * (-1) * (Zp2/Zp2d) \quad \text{Equation 1}$$

The target torque determination unit 91 uses second torque-balance information represented by equation 2 below to determine command torques Tm1_Hi and Tm2_Hi for the motors MG1 and MG2 in the Hi mode. In the present exemplary embodiment, the second torque-balance information is an equation for balancing the torques of the power transmission device 24.

$Ts1\_Hi = Te\_ref * r\_fr$ $Tc1\_Hi = Ts1\_Hi * (-1) * ((Zr1/Zs1)+1)$ $Tr2\_Hi = To\_ref * (Zod/Zo)$ $Ts2\_Hi = Tr2\_Hi * (Zs2/Zr2)$ $Tcp1\_Hi = Tc1\_Hi + Ts2\_Hi$ $Tm1\_Hi = Tcp1\_Hi * (-1) * (Zp1/Zp1d)$ $Tr1\_Hi = Ts1\_Hi * (Zr1/Zs1)$ $Tc2\_Hi = Tr2\_Hi * (-1) * ((Zs2/Zr2)+1)$ $Tcp2\_Hi = Tr1\_Hi + Tc2\_Hi$ $$Tm2\_Hi = Tcp2\_Hi * (-1) * (Zp2/Zp2d) \quad \text{Equation 2}$$

The contents of the parameters in the torque-balance information are depicted in Table 1 below.

TABLE 1

| | |
|---|---|
| Te_ref | Target input shaft torque |
| To_ref | Target output shaft torque |
| r_fr | Deceleration ratio for the FR switch mechanism 65 (The FR switch mechanism 65 outputs the engine rotation speed to decelerate at 1/r_fr. When the FR switch mechanism 65 is in the forward travel state, r_fr is a negative value. When the FR switch mechanism 65 is in the reverse travel state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

The target torque correcting unit 92 corrects the target torques Tm1_target and Tm2_target with the correction torques based on moments of inertia of the motors MG1 and MG2. The command-torque determination unit 83 determines the command torques Tm1_ref and Tm2_ref for the motors MG1 and MG2 by correcting the target torques Tm1_target and Tm2_target with the target torque correcting unit 92. The correction control performed by the target torque correcting unit 92 is explained in detail below.

Next, the control of the engine 21 by the control unit 27 is described in detail below. As described above, the control unit 27 controls the engine 21 by transmitting command signals to the fuel injection device 28. A method for determining the command throttle values for the fuel injection device 28 will be explained below. The control unit 27 has an engine requirement determination unit 87 and a required throttle determination unit 89.

The engine requirement determination unit 87 determines an engine required horsepower Hdm on the basis of the work implement required horsepower Hpto, the transmission required horsepower Htm, and the energy management required horsepower Hem. Specifically, the engine requirement determination unit 87 determines the engine required horsepower Hdm by adding the work implement required horsepower Hpto, the transmission required horsepower Htm, and the energy management required horsepower Hem.

The required throttle determination unit 89 determines a command throttle value Th_cm from the engine required horsepower Hdm and the accelerator operating amount Aac. The required throttle determination unit 89 uses an engine torque line Let and a matching line Lma stored in the storage unit 56 to determine the command throttle value Th_cm. The engine torque line Let defines a relationship between the output torque of the engine 21 and the engine rotation speed Ne. The matching line Lma is information for determining a first required throttle value from the engine required horse power Hdm.

The required throttle determination unit 89 determines the first required throttle value so that the engine torque line Let and the matching line Lma match at a matching point Pma1 where the output torque of the engine 21 becomes the torque corresponding to the engine required horsepower Hdm. The required throttle determination unit 89 determines the lowest required throttle value Th_cm from the first required throttle value and a second required throttle value corresponding to the accelerator operating amount Aac.

Next, the correction control performed by the target torque correcting unit 92 is explained in detail. In the correction control, the target torque correcting unit 92 corrects the target torques Tm1_target and Tm2_target with the correction torques based on the moments of inertia of the motors MG1 and MG2. Specifically, the target torque correcting unit 92 corrects the target torques Tm1_target and Tm2_target by using the following equation 3 to determine the command torques Tm1_ref and Tm2_ref for the motors MG1 and MG2.

$$Tm1\_ref = Tm1\_target + Tm1\_ic$$

$$Tm2\_ref = Tm2\_target + Tm2\_ic \quad \text{Equation 3}$$

Tm1_ic is the correction torque based on the moment of inertia of the first motor MG1. Tm2_ic is the correction torque based on the moment of inertia of the second motor MG2. That is, the target torque correcting unit 92 determines the command torque Tm1_ref for the first motor MG1 by adding the correction torque Tm1_ic of the first motor MG1 to the target torque Tm1_target of the first motor MG1. Further, the target torque correcting unit 92 determines the command torque Tm2_ref for the second motor MG2 by adding the correction torque Tm2_ic of the second motor MG2 to the target torque Tm2_target of the second motor MG2.

The target torque correcting unit 92 determines the correction torques Tm1_ic and Tm2_ic by using the following equation 4.

$$Tm1\_ic = r\_ic1 * Im1 * Am1$$

$$Tm2\_ic = r\_ic2 * Im2 * Am2 \quad \text{Equation 4}$$

Am1 is an angular acceleration of the first motor MG1. The angular acceleration Am1 of the first motor MG1 is calculated from the rotation speed of the first motor MG1 detected by the first motor rotation speed detecting unit 38. Am2 is an angular acceleration of the second motor MG2. The angular acceleration Am2 of the second motor MG2 is calculated from the rotation speed of the second motor MG2 detected by the second motor rotation speed detecting unit 39.

Im1 is the moment of inertia of the first motor MG1. Im2 is the moment of inertia of the second motor MG2. The moment of inertia Im1 of the first motor MG1 includes the moment of inertia of the rotor of the first motor MG1 and the moments of inertia of the rotating elements connected to the first motor MG1. The moment of inertia Im2 of the second motor MG2 includes the moment of inertia of the rotor of the second motor MG2 and the moments of inertia of the rotating elements connected to the second motor MG2. As mentioned above, the rotating elements connected to the motors MG1 and MG2 are switched in the Lo mode and the Hi mode. Therefore, the moments of inertia Im1 and Im2 are determined according to whether the current transmission path of the driving power is in the Lo mode or the Hi mode as depicted in the following table 2.

TABLE 2

| Moment of inertia | Lo mode | Hi mode |
| --- | --- | --- |
| Im1 | I_MG1 + I_Gm1 + I_Gc1 + I_C1 + I_P1 + I_S2 | I_MG1 + I_Gm1 + I_Gc1 + I_C1 + I_P1 + I_S2 |
| Im2 | I_MG2 + I_Gm2 + I_R1 + I_Gr1 | I_MG2 + I_Gm2 + I_R1 + I_Gr1 + I_C2 + I_P2 |

I_MG1 is the moment of inertia of the rotor of the first motor MG1 in the above table 2. I_Gm1 is the moment of inertia of the first motor gear m1. I_Gc1 is the moment of inertia of the first carrier gear Gc1. I_C1 is the moment of inertia of the first carrier C1. I_P1 is the moment of inertia of the first planet gears P1. I_S2 is the moment of inertia of the second sun gear 2. That is, I_Gm1+I_Gc1+I_C1+I_P1+I_S2 in the moment of inertia Im1 of the first motor MG1 in the Lo mode represents the moments of inertia of the rotating elements connected to the first motor MG1 in the Lo mode. Therefore, the moment of inertia Im1 of the first motor MG1 in the Lo mode includes the moments of inertia of the rotating elements connected to the first motor MG1 in the Lo mode. In the present exemplary embodiment, the rotating elements connected to the first motor MG1 in the Hi mode are the same as the rotating elements connected to the first motor MG1 in the Lo mode. Therefore, the moment of inertia Im1 of the first motor MG1 in the Hi mode is the same as the moment of inertia Im1 of the first motor MG1 in the Lo mode.

I_MG2 in the moment of inertia Im2 of the second motor MG2 in the Lo mode is the moment of inertia of the rotor of the second motor MG2. I_Gm2 is the moment of inertia of the second motor gear m2. I_R1 is the moment of inertia of the first ring gear R1. I_Gr1 is the moment of inertia of the first ring outer periphery gear Gr1. That is, I_Gm2+I_R1+ I_Gr1 in the moment of inertia Im2 of the second motor MG2 in the Lo mode represents the moments of inertia of the rotating elements connected to the second motor MG2 in the Lo mode. Therefore, the moment of inertia Im2 of the second motor MG2 in the Lo mode includes the moments of inertia of the rotating elements connected to the second motor MG2 in the Lo mode.

I_C2 in the moment of inertia Im2 of the second motor MG2 in the Hi mode is the moment of inertia of the second carrier C2. I_P2 is the moment of inertia of the second planet gears P2. That is, I_Gm2+I_R1+I_Gr1+I_C2+I_P2 from the moment of inertia Im2 of the second motor MG2 in the Hi mode represents the moments of inertia of the rotating elements connected to the second motor MG2 in the Hi mode. Therefore, the moment of inertia Im2 of the second motor MG2 in the Hi mode includes the moments of inertia of the rotating elements connected to the second motor MG2 in the Hi mode.

The rotating elements connected to the first motor MG1 signify the rotating elements that rotate while being interlocked with the first motor MG1. The interlocking rotating elements are rotating elements having proportional relationships with each of the rotation speeds. Therefore, the rotating elements interlocked and rotating with the first motor MG1 are rotating elements in which the rotation speeds of the rotating elements are proportional to the rotation speed of the first motor MG1. Similarly, the rotating elements connected to the second motor MG2 signify the rotating elements that rotate while being interlocked with the second motor MG2.

The above moments of inertia I_MG1 and I_Gm1 are moments of inertia around the rotating shaft of the first motor MG1. The moments of inertia I_Gc1, I_C1, I_P1, and I_S2 are ones in which the moments of inertia around the transmission shaft 67 are converted to the moments of inertia around the rotating shaft of the first motor MG1. The moments of inertia I_MG2 and I_Gm2 are moments of inertia around the rotating shaft of the second motor MG2. The moments of inertia I_R1, I_Gr1, I_C2, and I_P2 are ones in which the moments of inertia around the transmission shaft 67 are converted to the moments of inertia around the rotating shaft of the second motor MG2.

When a speed reduction gear r a speed increasing gear s combined with the motors MG1 and MG2, the moments of inertia Im1 and Im2 may be converted in response to a speed reduction ratio of the speed reduction gear r to a speed increasing ratio of the speed increasing gear. In this case, the moments of inertia Im1 and Im2 may include the moments of inertia of the speed reduction gear r the speed increasing gear.

r_ic1 is a first moment of inertia cancel ratio. r_ic2 is a second moment of inertia cancel ratio. The first moment of inertia cancel ratio r_ic1 and the second moment of inertia cancel ratio r_ic2 are both values between zero and one inclusive and include values greater than zero and less than one. The target torque correcting unit 92 determines the correction torque Tm1_ic on the basis of a value derived by multiplying the moment of inertia Im1 of the first motor MG1 by the first moment of inertia cancel ratio r_ic1. The target torque correcting unit 92 determines the correction torque Tm2_ic on the basis of a value derived by multiplying the moment of inertia Im2 of the second motor MG2 by the second moment of inertia cancel ratio r_ic2. As depicted in the following table 3, the first moment of inertia cancel ratio r_ic1 and the second moment of inertia cancel ratio r_ic2 are determined in response to the traveling state, the speed range, and the Hi/Lo mode.

TABLE 3

| Traveling state | Speed range | Hi/Lo mode | r_ic11 | r_ic2 |
| --- | --- | --- | --- | --- |
| Shuttle | 1st | Lo | a1 | b1 |
| Shuttle | 1st | Hi | a2 | b2 |
| Shuttle | 2nd-4th | Lo | a3 | b3 |
| Shuttle | 2nd-4th | Hi | a4 | b4 |
| Normal | 1st | Lo | a5 (=0) | b5 (=0) |
| Normal | 1st | Hi | a6 (=0) | b6 (=0) |
| Normal | 2nd-4th | Lo | a7 | b7 |
| Normal | 2nd-4th | Hi | a8 | b8 |

As illustrated in FIG. 6, the control unit 27 has a shuttle action evaluating unit 93, a speed range evaluating unit 94, and a Hi/Lo mode evaluating unit 95. The shuttle action evaluating unit 93 evaluates whether the work vehicle 1 is in a shuttle action on the basis of the rotating direction of the output shaft 63 and the position of the FR operating member 54a. Specifically, the shuttle action evaluating unit 93 determines that the vehicle is in the shuttle action when the travel direction according to the position of the FR operating member 54a differs from the travel direction of the vehicle. That is, when the position of the FR operating member 54a is the forward travel position (F) and the work vehicle 1 is traveling in reverse, the shuttle action evaluating unit 93 determines that the work vehicle 1 is in a shuttle action. When the position of the FR operating member 54a is the reverse travel position (R) and the work vehicle 1 is traveling forward, the shuttle action evaluating unit 93 also determines that the vehicle is in a shuttle action.

The speed range evaluating unit 94 determines the current speed range on the basis of the position of the speed change operating member 53a. The Hi/Lo mode evaluating unit 95 evaluates whether the transmission path is in the Hi mode or the Lo mode on the basis of the command signals to the clutch control valves VH and VL. The Hi/Lo mode evaluating unit 95 may make the evaluation on the basis of a detection signal from a sensor for detecting the states of the H-clutch CH and the L-clutch CL.

a1 to a8 in Table 3 are predetermined constants. a1 to a4 and a7 and a8 are greater than zero and less than one. a5 and a6 equal zero. b1 to b8 are predetermined constants. b1 to b4 and b7 and b8 are greater than zero and less than one. b5 and b6 are equal to zero. Therefore, when the traveling state is in the normal state and the speed range is in the first speed, the correction of the target torques Tm1_target and Tm2_target based on the correction torques Tm1_ic and Tm2_ic is not carried out. a5 and a6 may be a value other than zero. b5 and b6 may be a value other than zero.

The moment of inertia cancel ratios r_ic1 and r_ic2 are preferably set to values that decrease in correspondence to an increase in the fluctuation of the rotation speeds of the motors MG1 and MG2. Therefore for example, the moment of inertia cancel ratios r_ic1 and r_ic2 in the Lo mode are preferably equal to or less than the moment of inertia cancel ratios r_ic1 and r_ic2 in the Hi mode so long as the other conditions are the same.

In other words, the first moment of inertia cancel ratio r_ic1 when the rotation speed of the first motor MG1 increases in response to a decrease in the rotation speed ratio is preferably equal to or greater than the first moment of inertia cancel ratio r_ic1 when the rotation speed of the first motor MG1 decreases in response to a decrease in the rotation speed ratio. The second moment of inertia cancel ratio r_ic2 when the rotation speed of the second motor MG2 increases in response to a decrease in the rotation speed ratio is preferably equal to or greater than the second moment of inertia cancel ratio r_ic2 when the rotation speed of the second motor MG2 decreases in response to a decrease in the rotation speed ratio. Therefore, it is preferable that $a1 \leq a2$, $a3 \leq a4$, $a5 \leq a6$, and $a7 \leq a8$. Moreover it is preferable that $b1 \geq b2$, $b3 \geq b4$, $b5 \geq b6$, and $b7 \geq b8$.

The moment of inertia cancel ratios r_ic1 and r_ic2 when the speed range is the first speed are preferably equal to or less than the moment of inertia cancel ratios r_ic1 and r_ic2 when the speed range is the second speed to fourth speed when the other conditions are the same. The moment of inertia cancel ratios r_ic1 and r_ic2 during the shuttle action are preferably equal to or less than the moment of inertia cancel ratios r_ic1 and r_ic2 during the normal state when the other conditions are the same.

The work vehicle 1 according to the exemplary embodiments of the present embodiment has the following features.

The target torques Tm1_target and Tm2_target of the motors MG1 and MG2 determined by the target torque determination unit 91 are respectively corrected with the correction torques Tm1_ic and Tm2_ic based on the moments of inertia Im1 and Im2 of the motors MG1 and MG2. As a result, the impact of the moment of inertia of the power transmission device 24 on the behavior of the vehicle body can be reduced and a feeling of unease in the operator can be suppressed.

The moments of inertia Im1 and Im2 include the moments of inertia I_MG1, I_MG2 of the rotors of the motors MG1 and MG2 and the moments of inertia of the rotating elements connected to the motors MG1 and MG2. Therefore, the correction torques Tm1_ic and Tm2_ic are determined not only in consideration of the moments of inertia Im1 and Im2 of the internal structure of the motors MG1 and MG2, but also in consideration of the moments of inertia of the rotating elements connected to the motors MG1 and MG2. As a result, the impact of the moment of inertia of the power transmission device 24 on the behavior of the vehicle body can be further reduced in a suitable manner.

The rotation speed of the first motor MG1 is reduced in response to an increase in the rotation speed ratio within the rotation speed range of the motors MG1 and MG2 while the transmission path of the driving power is in the Hi mode. The rotation speed of the second motor MG2 is reduced in response to an increase in the rotation speed ratio within the rotation speed range of the motors MG1 and MG2 while the transmission path of the driving power is in the Lo mode. In this way, the impact of the moments of inertia of the motors MG1 and MG2 on the behavior of the vehicle body can be reduced and a feeling of unease in the operator can be suppressed even if the direction of change of the rotation speeds of the motors MG1 and MG2 differs from the direction of change of the rotation speed ratio.

The target torque correcting unit 92 determines the correction torque Tm1_ic on the basis of a value derived by multiplying the moment of inertia Im1 of the first motor MG1 by the first moment of inertia cancel ratio r_ic1. The target torque correcting unit 92 determines the correction torque Tm2_ic on the basis of a value derived by multiplying the moment of inertia Im2 of the second motor MG2 by the second moment of inertia cancel ratio r_ic2. The first moment of inertia cancel ratio r_ic1 and the second moment of inertia cancel ratio r_ic2 include values greater than zero and less than one. In this case, stability of the control can be improved even if a delay occurs in the timing for actually generating torque in the motors MG1 and MG2.

The first moment of inertia cancel ratio r_ic1 and the second moment of inertia cancel ratio r_ic2 are determined in response to the traveling state, the speed range, and the Hi/Lo modes. As a result, the first moment of inertia cancel ratio r_ic1 and the second moment of inertia cancel ratio r_ic2 can be determined suitably in response to the traveling state, the speed range, and the Hi/Lo modes. Accordingly, stability of the control can be further improved.

The present invention is not limited to the above exemplary embodiments and various changes and modifications may be made without departing from the spirit of the invention.

The present invention is not limited to the above-mentioned wheel loader and may be applied to another type of work vehicle, such as a bulldozer, a tractor, a forklift, or a motor grader.

The configuration of the power transmission device 24 is not limited to the configuration of the above exemplary embodiments. For example, the coupling and disposition of the elements of the two planetary gear mechanisms 68 and 69 are not limited to the coupling and disposition of the above exemplary embodiments. However, the number of the planetary gear mechanisms provided in the power transmission device 24 may only be one. Alternatively, the power transmission device 24 may have three or more planetary gear mechanisms.

The number of the motors provided in the power transmission device 24 may only be one. Alternatively, the power transmission device 24 may have three or more motors. For example, the power transmission device 24 may be provided with a third motor for assisting the first motor MG1 and the second motor MG2 by being selectively connected to the first motor MG1 and the second motor MG2. In this case, the target torque of the third motor may also be corrected with the correction torque based on the moment of inertia of the third motor.

The method for determining the target torques Tm1_target and Tm2_target is not limited to the method described in the exemplary embodiments. That is in the present exemplary embodiment, the target input shaft torque Te_ref and the target output shaft torque To_ref are determined so that predetermined vehicle speed-tractive force characteristics can be achieved in which the tractive force changes continuously in response to the vehicle speed. However, the target input shaft torque Te_ref and the target output shaft torque To_ref may be set optionally.

The torque-balance information is not limited to the equations for balancing the torque as in the above exemplary embodiment. For example, the torque-balance information may be in the format of a table or a map.

The moments of inertia Im1 and Im2 may not be changed in response to the Lo mode and the Hi mode and may be constant regardless of whether the mode is on the Hi mode or the Lo mode. The first moment of inertia cancel ratio r_ic1 and the second moment of inertia cancel ratio r_ic2 may not be determined in response to the traveling state and may be constant regardless of the traveling state. The first moment of inertia cancel ratio r_ic1 and the second moment of inertia cancel ratio r_ic2 may not be determined in response to the speed range and may be constant regardless of the speed range. The first moment of inertia cancel ratio r_ic1 and the second moment of inertia cancel ratio r_ic2 may not be determined in response to the Hi or Lo modes and may be constant regardless of the Hi or Lo modes. Alternatively, the first moment of inertia cancel ratio r_ic and the second moment of inertia cancel ratio r_ic2 may not be used.

The target torque of the electric motors may be corrected by not only canceling the moments of inertia of the rotors of the electric motors but also by canceling the moments of inertia of the rotating elements connected to the electric motors. However, the moment of inertia to be canceled may only be those of the rotors of the electric motors.

According to exemplary embodiments of the present invention, a feeling of unease in the operator is suppressed by reducing the impact of the moment of inertia in the EMT of a work vehicle on the behavior of the vehicle body.

What is claimed is:

1. A work vehicle comprising:
an engine;
a hydraulic pump driven by the engine;
a work implement driven by hydraulic fluid discharged from the hydraulic pump;
a travel device driven by the engine;
a power transmission device that transmits a driving power from the engine to the travel device; and
a control unit for controlling the power transmission device;
the power transmission device including
an input shaft;
an output shaft;
a gear mechanism that has a planetary gear mechanism and that transmits rotation of the input shaft to the output shaft; and
an electric motor connected to a rotating element of the planetary gear mechanism;
the power transmission device being configured to change a rotation speed ratio of the output shaft with respect to the input shaft by changing a rotation speed of the electric motor; and
the control unit including
a target torque determination unit that determines a target torque of the electric motor; and
a target torque correcting unit that corrects the target torque with a correction torque based on a moment of inertia of the electric motor,
the rotation speed of the electric motor being reduced in accordance with an increase in the rotation speed ratio in a range of at least a portion of the rotation speed of the electric motor.

2. The work vehicle according to claim 1, wherein the moment of inertia includes a moment of inertia of a rotor of the electric motor and a moment of inertia of the rotating element connected to the electric motor.

3. The work vehicle according to claim 1, wherein the power transmission device further has a mode-switching mechanism for selectively switching a transmission path of the driving power in the power transmission device between a plurality of modes that includes a first mode and a second mode,
the target torque correcting unit determines the correction torque on the basis of a value in which the moment of inertia of the electric motor is multiplied by a predetermined ratio greater than zero and less than one, and
the predetermined ratio is determined according to the mode.

4. The work vehicle according to claim 1, further comprising
a speed change operating member for selecting a speed range that defines an upper limit of a vehicle speed,
the target torque correcting unit determining the correction torque on the basis of a value in which the moment of inertia of the electric motor is multiplied by a predetermined ratio greater than zero and less than one, and
the predetermined ratio being determined according to the speed range selected with the speed change operating member.

5. The work vehicle according to claim 4, wherein the target torque correcting unit does not perform the correction of the target torque when a first speed is selected with the speed change operating member.

6. The work vehicle according to claim 1, further comprising
a forward/reverse travel operating member for selectively switching between at least a forward travel position and a reverse travel position to switch between forward travel and reverse travel of the work vehicle,
the control unit further including a shuttle action evaluating unit, the shuttle action evaluating unit evaluating whether the work vehicle is in a shuttle action when a direction corresponding to a position of the forward/reverse travel operating member differs from the travel direction of the vehicle, and
the target torque correcting unit determining the correction torque on the basis of a value in which the moment of inertia of the electric motor is multiplied by a predetermined ratio greater than zero and less than one, the predetermined ratio being determined in response to whether or not the work vehicle is in a shuttle action.

7. A work vehicle comprising:
an engine;
a hydraulic pump driven by the engine;
a work implement driven by hydraulic fluid discharged from the hydraulic pump;
a travel device driven by the engine;
a power transmission device that transmits a driving power from the engine to the travel device; and
a control unit for controlling the power transmission device;
the power transmission device including
an input shaft;
an output shaft;
a gear mechanism that has a planetary gear mechanism and that transmits rotation of the input shaft to the output shaft;
an electric motor connected to a rotating element of the planetary gear mechanism; and
a mode-switching mechanism for selectively switching a transmission path of the driving power in the power transmission device between a plurality of modes including a first mode and a second mode,
the power transmission device being configured to change a rotation speed ratio of the output shaft with respect to the input shaft by changing a rotation speed of the electric motor, and
the control unit including
a target torque determination unit that determines a target torque of the electric motor; and
a target torque correcting unit that corrects the target torque with a correction torque based on a moment of inertia of the electric motor, wherein
when the transmission path is in the first mode, the target torque correcting unit corrects the target torque with a correction torque based on a first moment of inertia, the first moment of inertia including the moment of inertia of the rotating element included in the transmission path of the first mode; and when the transmission path is in the second mode, the target torque correcting unit corrects the target torque with a correction torque based on a second moment of inertia, the second moment of inertia including a moment of inertia of the rotating element included in the transmission path of the second mode.

8. A work vehicle comprising:
an engine;
a hydraulic pump driven by the engine;
a work implement driven by hydraulic fluid discharged from the hydraulic pump;
a travel device driven by the engine;
a power transmission device that transmits a driving power from the engine to the travel device; and
a control unit for controlling the power transmission device;
the power transmission device including
an input shaft;
an output shaft;
a gear mechanism that has a planetary gear mechanism and that transmits rotation of the input shaft to the output shaft; and
an electric motor connected to a rotating element of the planetary gear mechanism;
the power transmission device being configured to change a rotation speed ratio of the output shaft with respect to the input shaft by changing a rotation speed of the electric motor; and
the control unit including
a target torque determination unit that determines a target torque of the electric motor; and
a target torque correcting unit that corrects the target torque with a correction torque based on a moment of inertia of the electric motor, the target torque correcting unit determining the correction torque on the basis of a value in which the moment of inertia of the electric motor is multiplied by a predetermined ratio greater than zero and less than one.

9. The work vehicle according to claim 8, wherein the predetermined ratio when the rotation speed of the electric motor increases in response to a decrease in the rotation speed ratio is no less than a predetermined ratio when the rotation speed of the electric motor decreases in response to a reduction in the rotation speed ratio.

10. The work vehicle according to claim 8, wherein the power transmission device further has a mode-switching mechanism for selectively switching a transmission path of the driving power in the power transmission device between a plurality of modes that includes a first mode and a second mode,
the target torque correcting unit determines the correction torque on the basis of a value in which the moment of inertia of the electric motor is multiplied by a predetermined ratio greater than zero and less than one, and
the predetermined ratio is determined according to the mode.

11. The work vehicle according to claim 8, further comprising
a speed change operating member for selecting a speed range that defines an upper limit of a vehicle speed,
the target torque correcting unit determining the correction torque on the basis of a value in which the moment of inertia of the electric motor is multiplied by a predetermined ratio greater than zero and less than one, and the predetermined ratio being determined according to the speed range selected with the speed change operating member.

12. The work vehicle according to claim 11, wherein the target torque correcting unit does not perform the correction of the target torque when a first speed is selected with the speed change operating member.

13. The work vehicle according to claim 8, further comprising
a forward/reverse travel operating member for selectively switching between at least a forward travel position and a reverse travel position to switch between forward travel and reverse travel of the work vehicle,
the control unit further including a shuttle action evaluating unit, the shuttle action evaluating unit evaluating whether the work vehicle is in a shuttle action when a direction corresponding to a position of the forward/reverse travel operating member differs from the travel direction of the vehicle,
the target torque correcting unit determining the correction torque on the basis of a value in which the moment of inertia of the electric motor is multiplied by a predetermined ratio greater than zero and less than one, and
the predetermined ratio being determined in response to whether or not the work vehicle is in a shuttle action.

14. A work vehicle comprising:
an engine;
a hydraulic pump driven by the engine;
a work implement driven by hydraulic fluid discharged from the hydraulic pump;
a travel device driven by the engine;
an accelerator operating member;
a power transmission device that transmits a driving power from the engine to the travel device; and
a control unit for controlling the power transmission device,
the power transmission device including
an input shaft;
an output shaft;
a gear mechanism that has a planetary gear mechanism and that transmits rotation of the input shaft to the output shaft; and
an electric motor connected to a rotating element of the planetary gear mechanism;
the power transmission device being configured to change a rotation speed ratio of the output shaft with respect to the input shaft by changing a rotation speed of the electric motor; and
the control unit including
a target torque determination unit that determines a target torque of the electric motor;
a target torque correcting unit that corrects the target torque with a correction torque based on a moment of inertia of the electric motor; and
a transmission requirement determination unit for determining, on the basis of an operating amount of the accelerator operating member, a required tractive force that is a target tractive force of the travel device,
the target torque determination unit determining the target torque of the electric motor so that the tractive force of the work vehicle becomes the required tractive force.

15. The work vehicle according to claim 14, wherein the target torque correcting unit determines the correction torque by multiplying the moment of inertia of the electric motor by a predetermined ratio greater than zero and less than one, and the target torque correcting unit corrects the target torque by adding the correction torque to the target torque.

16. A control method for a work vehicle, the work vehicle having
- an engine;
- a hydraulic pump driven by the engine;
- a work implement driven by hydraulic fluid discharged from the hydraulic pump;
- a travel device driven by the engine;
- a power transmission device that transmits a driving power from the engine to the travel device; wherein,
- the power transmission device including
  - an input shaft;
  - an output shaft;
  - a gear mechanism that has a planetary gear mechanism and that transmits rotation of the input shaft to the output shaft; and
  - an electric motor connected to a rotating element of the planetary gear mechanism;
  - the power transmission device being configured so that a rotation speed ratio of the output shaft with respect to the input shaft is changed by changing a rotation speed of the electric motor, the method comprising:
determining a target torque of the electric motor;
- correcting the target torque with a correction torque based on a moment of inertia of the electric motor; and
- reducing the rotation speed of the electric motor in accordance with an increase in the rotation speed ratio in a range of at least a portion of the rotation speed of the electric motor.

* * * * *